March 10, 1959 K. C. KING 2,876,917
LOADING AND UNLOADING EQUIPMENT
Filed April 24, 1957 2 Sheets-Sheet 1
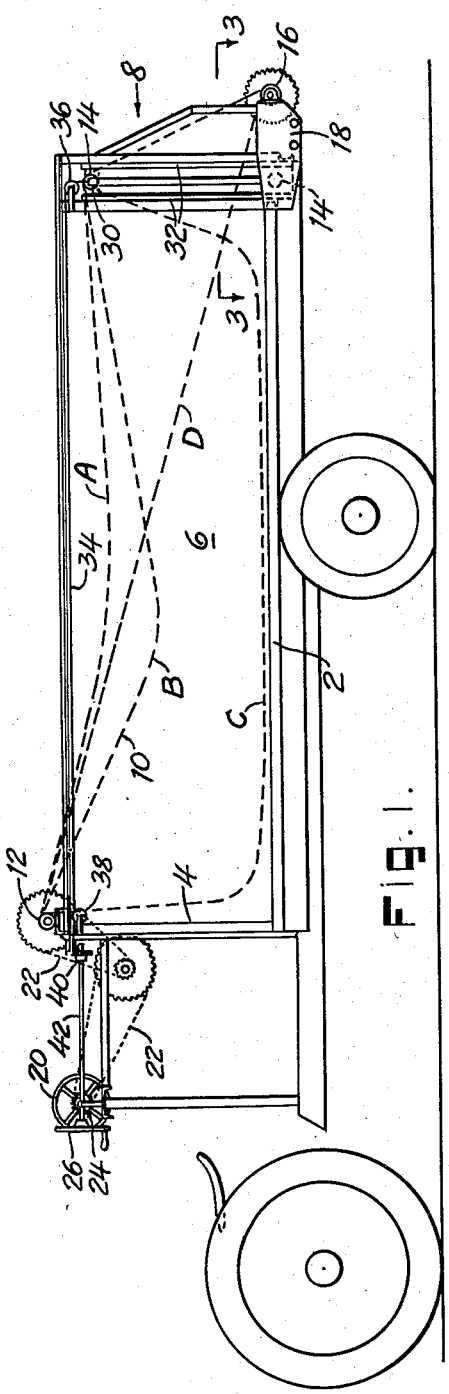
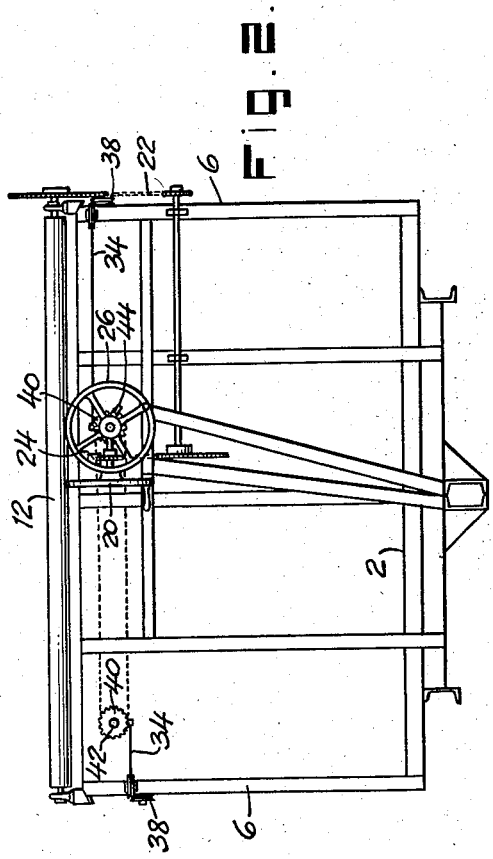
INVENTOR.
KARL C. KING
BY Albert Sperry.
ATTORNEY March 10, 1959 K. C. KING 2,876,917
LOADING AND UNLOADING EQUIPMENT
Filed April 24, 1957 2 Sheets-Sheet 2
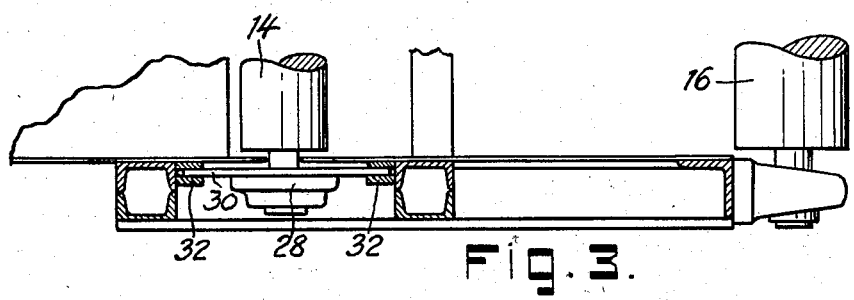
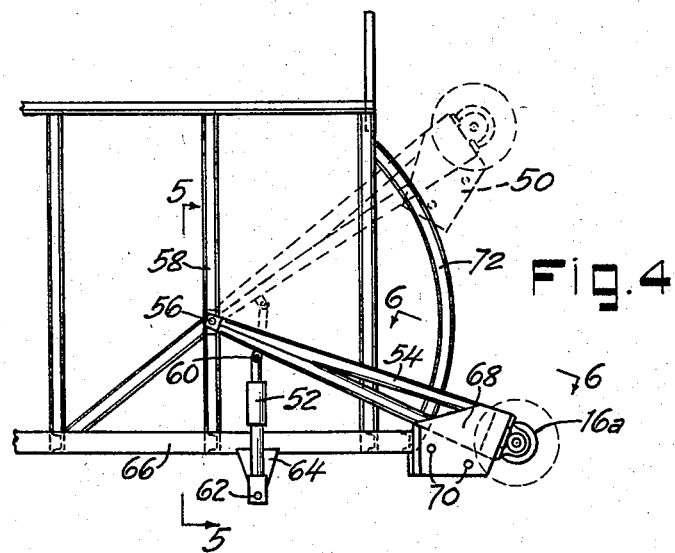
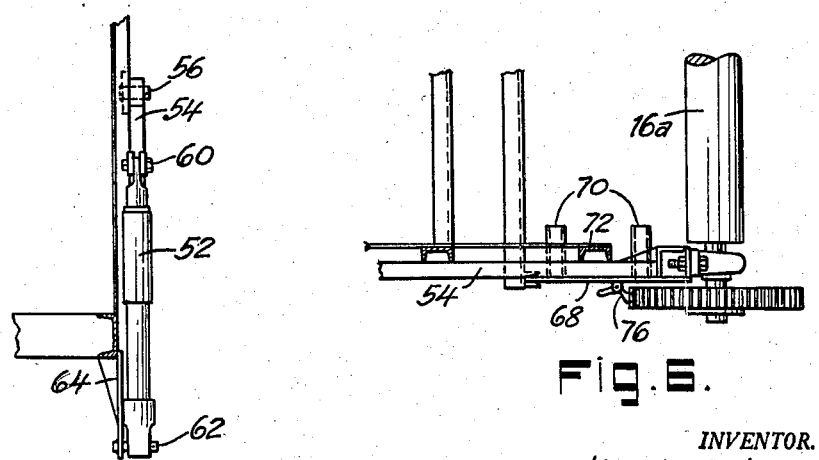
INVENTOR.
KARL C. KING
BY Albert Sperry
ATTORNEY

United States Patent Office 2,876,917
Patented Mar. 10, 1959

2,876,917

LOADING AND UNLOADING EQUIPMENT

Karl C. King, Morrisville, Pa.

Application April 24, 1957, Serial No. 654,737

6 Claims. (Cl. 214—82)

This invention relates to loading and unloading equipment for vehicles and is directed particularly to constructions adapted for use in unloading relatively fragile articles such as tomatoes and other vegetable products.

In harvesting crops and in handling other articles it is usual to use a vehicle having a body with relatively high side walls. The articles are fed or dumped into the body and when the body is empty or only partially filled, the articles fall several feet before striking the floor of the body or other articles already loaded into the vehicle. Under such conditions, articles such as vegetables and particularly tomatoes, heads of broccoli, cantaloupes and the like are often bruised and rendered unsalable.

Furthermore, when unloading the vehicle, the removal of the end gate or end closure for the body often allows the articles to be discharged too rapidly so that they spill onto the ground or are handled so roughly as to be damaged.

In accordance with the present invention, these objections and limitations of prior art constructions are overcome and means are provided for insuring the safe, gentle handling of articles during both loading and unloading of a vehicle and even when the vehicle body has high side walls.

These advantages are preferably obtained by providing the body with a flexible inner liner of canvas or the like and by raising and lowering the liner during the loading and unloading operations. The construction preferably also includes an end gate or closure which may be raised and lowered gradually, whereas the flexible liner may be drawn rearwardly as desired in discharging the load from the vehicle.

The principal object of the present invention is to provide a vehicle body with a flexible liner and novel means for manipulating the liner to insure gentle handling of articles loaded into or unloaded from the body.

Another object of the invention is to provide means for raising and lowering a flexible liner within a vehicle body to aid in the loading or unloading of articles.

A further object of the invention is to provide a vehicle body with a novel type of end gate or closure for controlling the unloading of articles from the body.

These and other objects and features of the present invention will appear from the following description thereof wherein reference is made to the figures of the accompanying drawings.

In the drawings:

Fig. 1 is a side elevation of a vehicle body showing one typical embodiment of the present invention;

Fig. 2 is a front end view of the vehicle body shown in Fig. 1;

Fig. 3 is a sectional view of the construction shown in Fig. 1 taken on the line 3—3 thereof;

Fig. 4 is a side elevation illustrating the rear portion of a vehicle body having an alternative type of end gate construction;

Fig. 5 is a horizontal sectional view of a portion of the construction shown in Fig. 4 taken on the line 5—5 thereof; and Fig. 6 is a vertical sectional view of a portion of the construction shown in Fig. 4 taken on the line 6—6 thereof.

In that form of the invention chosen for purposes of illustration in Figs. 1, 2 and 3 the vehicle, which may be a truck, for example, is provided with a body having a floor or bottom 2, a front end wall 4, two opposite side walls, one of which is shown at 6, and an end gate assembly indicated generally at 8. The side and end walls of the body may be relatively high, say 4 feet, and articles such as vegetables or the like may be loaded into the vehicle body through the open top thereof from a loading conveyor or by dumping baskets, crates or hampers over the side walls.

A flexible liner for the vehicle body is shown at 10 and preferably is in the form of a web of canvas or the like substantially equal in width to the vehicle body. The front end of the liner is secured to a roller 12 mounted adjacent the top of the front end wall 4 of the body, whereas the rear end portion of the liner passes over a roller 14 forming a part of the end gate assembly and extends downward to an unloading roller 16 located adjacent the rear end of the body at or below the floor 2 of the body. The unloading roller is designed to be power driven by suitable means such as a portable power unit (not shown) which may be of the type shown in U. S. Patent No. 2,595,395. For this purpose, the rear end of the body may be provided with a bracket 18 to which the power unit may be applied for winding up the flexible liner so as to draw it toward the rear of the vehicle body in unloading articles therefrom.

The roller 12, about which the front end of the flexible liner is wound, is adapted to be rotated by means of the hand wheel 20 and the driving chains or belts 22. The hand wheel is preferably located in a convenient position near the front of the vehicle for operation by the driver and suitable means such as a ratchet and pawl 24 may be located near the hand wheel for holding the roller 12 and the flexible liner 10 in any adjusted position desired.

A second hand wheel 26 located near the driver's seat is operable to raise and lower the roller 14 of the rear end gate assembly over which the flexible liner passes to the unloading roller 16. For this purpose, the roller 14 is mounted at its opposite ends in bearing blocks 28 having guide plates 30 provided with end portions slidable up and down along the grooved uprights 32 located adjacent the rear of the vehicle body. A cable 34 is connected to each of the bearing blocks and passes over a pulley 36 near the upper end of the rear upright 32 and about a pulley 38 near the front of the body to the drum 40 on shaft 42. The hand wheel 26 is secured to shaft 42 and therefore may be manipulated to raise or lower the roller 14 to raise or lower the end gate assembly as desired. A ratchet and pawl 44 may also be provided for the shaft 42 to hold the roller 14 in any elevated position to which it is moved.

In using the construction described, the hand wheel 26 is initially operated to raise the roller 14 of the end gate assembly to its uppermost position as shown in full lines in Fig. 1. The hand wheel 20 is similarly rotated to wind up the flexible liner 10 on the roller 12 at the front of the vehicle body until the liner assumes a raised position such as that shown at A in Fig. 1. When in such a raised position, the flexible liner serves as a yieldable hammock or sling located near the top of the vehicle body. Articles discharged or dumped into the body will, therefore, fall but a limited distance and will land on the hammock so that they will not be bruised or injured by the fall. As the load supported on the liner rises, the hand wheel 20 may be manipulated to lower the liner to some position such as that indicated by the dotted line B whereby the upper level of the load may be maintained at or near the top of the vehicle body. As the load further increases and the liner is further lowered, the liner will ultimately reach a fully lowered position in which it substantially conforms to the form of the vehicle body as indicated by the dotted line C.

In this way the body may be fully loaded while the articles themselves are protected from injury during the loading operation. Of course, if the weight of the articles would be sufficient to crush those at the bottom when the body is fuly loaded, the liner 10 may be held in the position B so as to handle a partial load as easily as a full load.

After the vehicle has been loaded and when it is desired to discharge the load, the hand wheel 26 is manipulated to lower the roller 14 of the end gate assembly. At the same time, the unloading roller 16 may be actuated to take up the slack in the flexible liner. The portion of the load near the end gate assembly will be discharged by gravity in a controlled manner as the roller 14 is gradually lowered to open the rear end of the vehicle body.

Thereafter when roller 14 is in its lowermost position near the floor 2 of the vehicle body as shown in dotted lines in Fig. 1, the roller 12 is released to allow the front portion of the liner to be unrolled from roller 12. The unloading roller 16 is then driven to continue its rotation whereby it serves to draw the liner with the load thereon rearwardly over the floor of the body toward the open end thereof. The entire load may thus be discharged through the open rear end of the body in a gradual and controlled manner so that it may be delivered to a conveyor or other means at the unloading point without rough handling or injury to the articles.

If the load is relatively light and of only limited depth, the roller 12 need not be released for the purpose of discharging the load. It may instead be held in fixed position by the ratchet and pawl 24 or other means and the liner may be drawn rearwardly by the unloading roller until it has taken up the slack in the liner and has been placed under sufficient tension to raise the liner with the load thereon to the inclined position indicated in dotted lines at D in Fig. 1. The articles will then be caused to roll rearwardly down the inclined liner for discharge through the open rear end of the body. However, in normal operation such tensioning of the liner and lifting of the load is not usually desirable.

In any event, when the load has been discharged from the rear of the vehicle body, the power unit is disconnected from the unloading roller 16 and the hand wheel 20 is operated to draw the liner from the unloading roller and wind it back onto roller 12 at the front end of the body. At the same time, or when desired, the hand wheel 26 may be operated to raise the roller 14 of the end gate assembly whereby the rear end of the vehicle body will be closed and the liner will be restored to its initial position in which it serves as a hammock-like support preparatory to receiving another load of vegetables or other articles.

In the alternative form of the invention shown in Figs. 4, 5 and 6 of the drawing, the rear end gate assembly is designed in such a manner that the unloading roller 16a is moved from a lowered discharged position as shown in full lines in Fig. 4 to a raised end closing position as indicated in dotted lines at 50. It is, therefore, possible to use the unloading roller itself as a movable member of the end gate assembly. Further, as shown in Fig. 4, the unloading roller 16a is movable to and from its lowered unloading position by means of a hydraulic or other power actuated member 52.

In this embodiment of the invention, the unloading roller 16a is carried by an arm 54 pivotally mounted at 56 upon a stationary upright 58. The hydraulic member 52 is pivotally connected at 60 to the arm 54 and is connected at its lower end by a pivot 62 held by a bracket 64 mounted on the side rail 66 adjacent the floor of the vehicle body. The arm 54 further is provided with a plate 68 having sockets 70 therein for receiving a portable power unit for driving the unloading roller 16a. A typical unit of this type is shown in U. S. Patent No. 2,595,395 but, if desired, a power unit may be permanently mounted on the plate 68 carried by arm 54.

In order to aid in guiding the arm 54 in its rocking movement about the pivot 56 in raising and lowering the unloading roller 16a, an arcuate guide member 72 may be provided which serves to prevent end play or lateral displacement of the unloading roller 16a and the arms 54. Further, the unloading roller may be provided with a ratchet and pawl construction indicated generally at 76 to prevent unwinding movement of the unloading roller when the roller is in its raised position and the flexible liner is supported in the hammock-like location indicated in dotted lines A and B of Fig. 1.

In using the embodiment of the invention shown in Figs. 4, 5 and 6, the hydraulic device 52 is actuated to raise the unloading roller 16a to the position 50 and the flexible liner 10 is drawn up to the position shown at A in Fig. 1 preparatory to loading vegetables or other articles into the vehicle body. The unloading roller 16a is held in such a raised position during the subsequent adjustments of the liner to the positions B and C as the load is increased in filling the vehicle body.

When the vehicle has been fully loaded and moved to the point where the load is to be discharged, the hydraulic device 52 is actuated to lower the unloading roller 16 to the position shown in full lines in Fig. 4 of the drawing. The portion of the load near the rear end of the body is thus allowed to be discharged by gravity, after which the power unit is applied to the bracket 68 and the unloading roller 16a is driven so as to wind up the liner thereon. In this way, the liner and the load are drawn rearwardly over the floor of the vehicle body toward the open rear end of the body. The articles are thereby discharged from the body in a gentle and controlled manner for delivery to a conveyor or other receiving means.

After the load is fully discharged from the body, the power unit may be removed from the bracket 68 and the liner can be unrolled from the rear unloading roller 16a and wound up upon the roller 12 adjacent the top of the front end wall of the body. The hydraulic device 52 is then actuated to again raise the unloading roller 16a to the position 50 whereupon the vehicle body is prepared to receive a further load or articles.

The flexible liner employed in constructions embodying the present invention may be controlled and moved in various other ways to provide the desired yieldable hammock-like action thereof and each of the rollers over which the liner passes in the various forms of the invention may be controlled and moved in any suitable manner to accomplish the desired results. The construction and manner of moving the rear end portion of the conveyor to provide an end gate assembly which may be raised and lowered in closing and opening the rear end of the body also can be varied considerably. It will, therefore, be apparent that the particular form, construction and arrangement of the various elements of the combination are capable of numerous changes and modifications to meet any conditions encountered. In view thereof it should be understood that the particular forms of the invention shown in the drawings and described above are intended to be illustrative only and are not intended to limit the scope of the invention.

I claim:

1. A vehicle body comprising a floor, front and side walls extending upward from the floor, a closure assembly located near the rear of the body and including a member movable upward and downward adjacent the rear end of the body from a point near said floor to a point near the top of said side walls, a flexible liner for the body movable with said member to raised and lowered positions to close and open the rear end of the body, and an unloading roller to which said liner is connected and upon which the liner may be wound in discharging articles from the body.

2. A vehicle body comprising a floor, front and side walls extending upward from the floor, a closure assembly located near the rear of the body and including a roller movable to raised and lowered positions from a point near said floor to a point near the top of said side walls, a flexible liner for the body having a front end portion extending to the front end of the body and having a rear end portion extending over the roller and movable thereby to raised and lowered positions to close and open the rear end of the body and means for holding said liner suspended above the floor of the body during the loading of articles into the body.

3. A vehicle body comprising a floor, front and side walls extending upward from the floor, a closure assembly located near the rear of the body and including a roller movable to raised and lowered positions from a point near said floor to a point near the top of said side walls, a flexible liner for the body having a front end portion extending to the front end of the body and having a rear end portion extending over the roller and movable thereby to raised and lowered positions to close and open the rear end of the body and means operable when said roller is in a lowered position for drawing the liner rearwardly to discharge articles from the open rear end of the body.

4. A vehicle body having a floor, front and side walls extending upward from the floor of the body, a closure assembly located adjacent the rear end of the body and operable to open and close the rear end of the body, a roller adjacent the top of the front wall of the body, another roller forming a part of said closure assembly, a flexible liner extending from one of said rollers to the other, means for raising said liner to a position in which it is suspended by said rollers above the floor of said body, and means for moving the roller which forms a part of said closure assembly to effect the discharge of articles from the rear end of the body.

5. A vehicle body comprising a floor, front and side walls extending upward from said floor, a roller located adjacent the top of the front wall of the body, a flexible liner extending from said roller rearwardly over the floor of the body, an end closure assembly located near the rear end of the body and including a roller movable from a point near the floor of the body to a point near the top of said side walls, said flexible liner extending over the roller of the rear closure assembly and movable thereby to close and open the rear end of the body.

6. A vehicle body comprising a floor, front and side walls extending upward from said floor, a roller located adjacent the top of the front wall of the body, a flexible liner extending from said roller rearwardly over the floor of the body, an end closure assembly located near the rear end of the body and including a roller movable from a point near the floor of the body to a point near the top of said side walls, said flexible liner extending over the roller of the rear closure assembly and movable thereby to close and open the rear end of the body and means for drawing said liner rearwardly over the floor of said body in discharging a load from said body.

References Cited in the file of this patent
UNITED STATES PATENTS

| | | |
|---|---|---|
| 1,091,656 | Harnly | Mar. 31, 1914 |
| 1,207,795 | Riekenberg | Dec. 12, 1916 |
| 2,045,149 | Vessey | June 23, 1936 |
| 2,298,747 | Agar | Oct. 13, 1942 |
| 2,483,582 | Hill | Oct. 4, 1949 |
| 2,513,355 | Peckinpaugh | July 4, 1950 |
| 2,551,368 | Flinchbaugh | May 1, 1951 |
| 2,573,584 | Le Tourneau | Oct. 30, 1951 |
| 2,632,627 | Shultz | Mar. 24, 1953 |